US007951457B2

(12) United States Patent
Casteren Van et al.

(10) Patent No.: US 7,951,457 B2
(45) Date of Patent: *May 31, 2011

(54) LOW NMP AQUEOUS POLYURETHANE COMPOSITION WITH REACTIVE DILUENT

(75) Inventors: Ilse Casteren Van, Waalwijk (NL); Marc Roelands, Waalwijk (NL); Geraldus Cornelis Overbeek, Waalwijk (NL); Richard George Coogan, Wilmington, MA (US); Ronald Tennebroek, Waalwijk (NL); Ann Kuzmin, Wilmington, MA (US)

(73) Assignee: DSM IP Assets B.V., Heerlen (NL)

( * ) Notice: Subject to any disclaimer, the term of this patent is extended or adjusted under 35 U.S.C. 154(b) by 1124 days.

This patent is subject to a terminal disclaimer.

(21) Appl. No.: 11/630,363

(22) PCT Filed: Jun. 28, 2005

(86) PCT No.: PCT/EP2005/006932
§ 371 (c)(1),
(2), (4) Date: Feb. 22, 2007

(87) PCT Pub. No.: WO2006/002864
PCT Pub. Date: Jan. 12, 2006

(65) Prior Publication Data
US 2008/0038563 A1    Feb. 14, 2008

(30) Foreign Application Priority Data
Jun. 30, 2004    (GB) .................................. 0414594.2

(51) Int. Cl.
B32B 15/895    (2006.01)
B32B 17/10    (2006.01)
B32B 21/08    (2006.01)
C08G 18/02    (2006.01)

(52) U.S. Cl. ............... 428/425.1; 428/425.6; 428/425.9; 428/426; 428/457; 428/537.1; 106/287; 524/840; 528/73

(58) Field of Classification Search ............... 428/423.1, 428/425.1, 425.6, 425.8, 425.9, 426, 457, 428/537.1; 106/287.2; 524/840; 528/73
See application file for complete search history.

(56) References Cited

U.S. PATENT DOCUMENTS

| 4,912,154 | A | * | 3/1990 | Arora et al. ................... 524/840 |
| 4,927,876 | A | * | 5/1990 | Coogan et al. ................. 524/501 |
| 4,983,662 | A | * | 1/1991 | Overbeek et al. .............. 524/501 |
| 5,137,961 | A | | 8/1992 | Goos et al. |
| 5,169,895 | A | * | 12/1992 | Coogan et al. ................. 524/591 |
| 5,371,133 | A | | 12/1994 | Stanley |
| 7,439,299 | B2 | * | 10/2008 | Coogan et al. ................. 524/840 |
| 7,569,636 | B2 | * | 8/2009 | Tennebroek et al. ......... 524/501 |
| 7,683,139 | B2 | * | 3/2010 | Casteren Van et al. ....... 525/453 |
| 2003/0124357 | A1 | | 7/2003 | Kagerer et al. |
| 2008/0274361 | A1 | | 11/2008 | Casteren Van et al. |

FOREIGN PATENT DOCUMENTS

| JP | 10-237138 | 9/1998 |
| JP | 10-292024 | 11/1998 |
| JP | 10-338732 | 12/1998 |

* cited by examiner

Primary Examiner — Thao T. Tran
(74) Attorney, Agent, or Firm — Nixon & Vanderhye P.C.

(57) ABSTRACT

An aqueous composition comprising a polyurethane dispersion with a sediment content $\leq 5\%$, wherein the polyurethane has an acid value in the range of from 25 to 65 mgKOH/g and comprises (i) 36 to 60 wt % of at least one aromatic polyisocyanate and where the polyurethane is prepared in the presence of (a) $\leq 5$ wt % of 1-methyl-2-pyrrolidinone by weight of the polyurethane and (b) at least one reactive diluent.

27 Claims, No Drawings

US 7,951,457 B2

LOW NMP AQUEOUS POLYURETHANE COMPOSITION WITH REACTIVE DILUENT

This application is the US national phase of international application PCT/EP2005/006932 filed 28 Jun. 2005 which designated the U.S. and claims benefit of GB 0414594.2, dated 30 Jun. 2004, the entire content of which is hereby incorporated by reference.

The present invention relates to an aqueous composition comprising a polyurethane dispersion, an aqueous composition comprising a polyurethane vinyl hybrid dispersion, a process for making the aqueous compositions and the use of such aqueous compositions in coatings such as coatings for floors.

It is well known in the coatings industry that polyurethane dispersions can be applied to a variety of substrates to provide coatings with good resistance to abrasion, good chemical resistance, good flexibility and durability as well as having good adhesion to the substrate. A major application for such coatings is as clear coatings for wood flooring.

Conventionally polyurethane compositions are prepared in organic solvents which evaporate on drying after application to a substrate. For reasons of environmental protection and adherence to solvent emission guidelines water-based polyurethane dispersions and polyurethane vinyl hybrid dispersions have been developed and are well known.

It is also known that polyurethanes based predominantly on aromatic polyisocyanates have better hardness, better resistance against chemicals and better mechanical properties in for example flooring applications than polyurethanes based predominantly on aliphatic isocyanates. Furthermore the use of aromatic polyisocyanates tends to be more cost effective than the use of aliphatic polyisocyanates.

U.S. Pat. Nos. 4,801,644 and 4,927,876 disclose the preparation of aqueous polyurethane compositions containing diphenylmethane-2,4-diisocyanate utilising 1-methyl-2-pyrrolidinone as an organic solvent.

U.S. Pat. No. 5,173,526 discloses a method for making aqueous polyurethane-vinyl polymer dispersions with 1-methyl-2-pyrrolidinone being used as a solvent.

U.S. Pat. No. 5,314,942 discloses an aqueous polymer dispersion containing a vinyl polymer prepared in-situ and a water-dispersible polyurethane having pendent polyethylene oxide chains and utilising 1-methyl-2-pyrrolidinone.

U.S. Pat. No. 6,239,209 discloses an air-curable polyurethane-acrylic hybrid interpenetrating polymer network.

U.S. Pat. No. 6,566,438 discloses aliphatic polyurethane vinyl hybrid compositions containing 1-methyl-2-pyrrolidinone.

JP 06-08553 and JP 03-193446 disclose the preparation of polyurethane-polyurea dispersions.

However such water-based polyurethanes and polyurethane vinyl hybrids, especially if based on aromatic polyisocyanates, still utilise significant amounts of high-boiling and water-soluble solvents such as 1-methyl-2-pyrrolidinone (NMP) to reduce the viscosity during production and these solvents remain in the aqueous composition after dispersion of the polyurethane in water and then evaporate on drying.

Proposed changes in legislation on the labelling of products containing NMP are resulting in increased efforts to minimise and even eliminate the use of NMP altogether.

U.S. Pat. No. 4,318,833 discloses water-reducible acrylic-urethane coating compositions where the polyurethanes are prepared in a solvent mixture.

U.S. Pat. No. 4,644,030 discloses aqueous polyurethane-polyolefin compositions.

U.S. Pat. No. 5,137,961 discloses the preparation of a surfactant free aqueous polymer dispersion containing an anionic polyurethane based substantially on aliphatic isocyanates and a vinyl polymer where vinyl monomers are used to reduce the viscosity of the reaction mixture.

U.S. Pat. No. 6,635,706 discloses a pre-crosslinked urethane-acrylic dispersion.

U.S. Pat. No. 6,635,723 discloses a process for making a solvent-free polyurethane dispersion using a relatively low aliphatic polyisocyanate content.

U.S. Pat. No. 6,720,385 discloses aqueous polyurethane latexes prepared without the use of organic solvents using relatively high levels of polyethylene oxide polyols.

JP 09-150568, JP 09-150569, JP 09-102861 and JP 09-038674 disclose the preparation of aqueous polyurethane compositions utilising unsaturated monomers and hydroxyl groups bearing organic solvents.

A disadvantage resulting from the preparation of polyurethanes based on aromatic isocyanates and with very low NMP levels or with no NMP at all is that the processing usually results in a high level of sediment and/or gel. Furthermore in the prior art there is a desire to keep the level of polyisocyanate used in the polyurethane preparation to a minimum in order to get acceptable processing.

Surprisingly we have found that it is possible to prepare polyurethanes with a high level of aromatic polyisocyanate content as well as a low NMP content and yet maintain good processability with low levels of sediment to give dispersions that may form hard and resistant coatings.

According to the present invention there is provided an aqueous composition with a sediment content $\leq 5\%$, comprising a polyurethane dispersion and containing $\leq 5$ wt % of 1-methyl-2-pyrrolidinone by weight of the polyurethane, wherein the polyurethane has an acid value in the range of from 25 to 65 mgKOH/g and is obtained by the reaction of:

A) an isocyanate-terminated prepolymer formed from components comprising:
  (i) 36 to 60 wt % of at least one aromatic polyisocyanate;
  (ii) 0 to 30 wt % of at least one aliphatic polyisocyanate;
  (iii) 0 to 15 wt % of at least one isocyanate-reactive polyol bearing ionic and/or potentially ionic water-dispersing groups with a weight average molecular weight $\leq 500$ g/mol;
  (iv) 0 to 10 wt % of at least one isocyanate-reactive polyol bearing non-ionic water-dispersing groups;
  (v) 0 to 15 wt % of at least one isocyanate-reactive polyol with a weight average molecular weight $\leq 500$ g/mol not comprised by (iii) or (iv);
  (vi) 20 to 58 wt % of at least one isocyanate-reactive polyol not comprised by (iii), (iv) or (v);
  where (i)+(ii)+(iii)+(iv)+(v)+(vi) add up to 100 wt %;
  where the NCO/OH ratio is in the range of from 1.2:1 to 2.5:1; and
B) at least one active-hydrogen chain extending compound;
where the active hydrogen/NCO ratio is in the range of from 0.4:1 to 1.3:1; in the presence of (a) $\leq 5$ wt % of 1-methyl-2-pyrrolidinone by weight of polyurethane; and (b) at least one reactive diluent.

Preferably the aqueous composition comprising a polyurethane dispersion contains $\leq 3$ wt %, more preferably $\leq 1$ wt %, most preferably $\leq 0.5$ wt % and especially 0 wt % of NMP by weight of the polyurethane.

For clarity by weight of polyurethane is meant the weight of polyurethane solids excluding the reactive diluent.

According to a second embodiment of the present invention there is provided an aqueous composition with a sediment content ≦5%, comprising a polyurethane vinyl hybrid dispersion and containing ≦0.5 wt % of 1-methyl-2-pyrrolidinone by weight of the composition;

wherein the polyurethane has an acid value in the range of from 25 to 65 mgKOH/g and is obtained by the reaction of:
A) an isocyanate-terminated prepolymer formed from components comprising:
  (i) 36 to 60 wt % of at least one aromatic polyisocyanate;
  (ii) 0 to 30 wt % of at least one aliphatic polyisocyanate;
  (iii) 0 to 15 wt % of at least one isocyanate-reactive polyol bearing, ionic and/or potentially ionic water-dispersing groups with a weight average molecular weight ≦500 g/mol;
  (iv) 0 to 10 wt % of at least one isocyanate-reactive polyol bearing non-ionic water-dispersing groups;
  (v) 0 to 15 wt % of at least one isocyanate-reactive polyol with a weight average molecular weight ≦500 g/mol not comprised by (iii) or (iv);
  (vi) 20 to 58 wt % of at least one isocyanate-reactive polyol not comprised by (iii), (iv) or (v);
  where (i)+(ii)+(iii)+(iv)+(v)+(vi) add up to 100 wt %;
  where the NCO/OH ratio is in the range of from 1.2:1 to 2.5:1; and
B) at least one active-hydrogen chain extending compound;

where the active hydrogen/NCO ratio is in the range of from 0.4:1 to 1.3:1; in the presence of (a) ≦5 wt % of 1-methyl-2-pyrrolidinone by weight of polyurethane and (b) at least one reactive diluent.

Preferably components (i)+(ii)+(iii)+(v) add up to ≧42 wt % more preferably ≧46 wt % and especially ≧50 wt %.

Preferably the composition of the invention contains 0 wt % of NMP.

By a polyurethane vinyl hybrid is meant that a vinyl polymer is prepared by the polymerisation of vinyl monomers in the presence of the polyurethane. The vinyl polymer may be grafted to the polyurethane or alternatively the vinyl polymer is not grafted to the polyurethane during the polymerisation.

For clarity the terms polyurethane, vinyl polymer, vinyl monomer and polyurethane vinyl hybrid are intended to cover the singular as well as the plural. Preferably the ratio of polyurethane to vinyl polymer in the polyurethane vinyl hybrid is in the range of from 95:5 to 30:70, more preferably 85:15 to 35:65 and most preferably 75:25 to 40:60.

Preferably the acid value of the polyurethane is in the range of from 29 to 55 mgKOH/g, more preferably 30 to 55 mgKOH/g and most preferably 31 to 53 mgKOH/g of polyurethane.

The aromatic polyisocyanate component (i) can be a mixture of aromatic polyisocyanates. This term (for the sake of clarity) being intended to mean compounds in which all of the isocyanate groups are directly bonded to an aromatic group, irrespective of whether aliphatic groups are also present. Examples of suitable aromatic polyisocyanates include but are not limited to p-xylylene diisocyanate, 1,4-phenylene diisocyanate, 2,4-toluene diisocyanate, 2,6-toluene diisocyanate, 4,4'-methylene bis(phenyl isocyanate), polymethylene polyphenyl polyisocyanates, 2,4'-methylene bis(phenyl isocyanate) and 1,5-naphthylene diisocyanate.

Preferably the isocyanate-terminated prepolymer comprises 36 to 50 wt %, more preferably 37 to 46 wt % of component (i).

Preferably component (i) comprises methylene bis(phenyl isocyanate) (all isomers) and/or toluene diisocyanate (all isomers). More preferably component (i) comprises from 10 to 70 wt % of toluene diisocyanate and from 90 to 30 wt % of methylene bis(phenyl isocyanate). Even more preferably component (i) comprises from 25 to 60 wt % of toluene diisocyanate and from 75 to 40 wt % of methylene bis(phenyl isocyanate) where preferably the methylene bis(phenyl isocyanate) is a mixture of 4,4' and 2,4'-methylene bis(phenyl isocyanate), where the mixture preferably contains from 5 to 70 wt % of 2,4'-methylene bis(phenyl isocyanate).

The aliphatic polyisocyanate component (ii) can be a mixture of aliphatic isocyanates. This term (for the sake of clarity) being intended to mean compounds in which all of the isocyanate groups are directly bonded to aliphatic or cycloaliphatic groups, irrespective of whether aromatic groups are also present.

Examples include but are not limited to ethylene diisocyanate, para-tetramethylxylene diisocyanate (p-TMXDI), meta-tetramethylxylene diisocyanate (m-TMXDI), 1,6-hexamethylene diisocyanate, isophorone diisocyanate, cyclohexane-1,4-diisocyanate and 4,4'-dicyclohexylmethane diisocyanate.

Preferably the isocyanate-terminated prepolymer comprises 0 to 12 wt %, more preferably 0 wt % of component (ii).

Preferably at least 70 wt %, more preferably at least 85 wt % and most preferably at least 95 wt % of the polyisocyanates in components (i) and (ii) have two isocyanate groups.

Aromatic or aliphatic polyisocyanates which have been modified by the introduction of urethane, allophanate, urea, biuret, uretonimine, urethdione or isocyanurate residues can be used for components (i) and (ii) respectively.

The isocyanate-reactive components (iii) to (vi) will normally consist of a polyol component bearing isocyanate-reactive groups which may also bear other reactive groups. By a polyol component it is also meant to include compounds with one or more isocyanate-reactive groups such as —OH, —SH, —NH— and —NH$_2$.

Water-dispersing groups are preferably introduced by employing at least one isocyanate-reactive compound bearing a non-ionic and/or ionic water-dispersing groups as a component in the preparation of the isocyanate-terminated prepolymer. Preferably component (iii) comprises anionic or potentially anionic water-dispersing groups. Examples of compounds bearing anionic water-dispersing groups include phosphoric acid groups, sulphonic acid groups and/or carboxylic acid groups such as carboxyl group containing diols and triols. Preferably component (iii) comprises dihydroxy alkanoic acids such as 2,2-dimethylolpropionic acid (DMPA) and/or 2,2-dimethylolbutanoic acid (DMBA).

The anionic water-dispersing groups are preferably fully or partially in the form of a salt. Conversion of for example a potentially anionic water-dispersing group to the salt form (i.e. anionic water-dispersing group) may be effected by neutralisation with a base, preferably during the preparation of the aqueous composition of the present invention. If the anionic water-dispersing groups are neutralised, the base used to neutralise the groups may be selected from ammonia, an amine, an inorganic base and combinations thereof. Preferably ammonia and inorganic bases are only used in combination with other neutralising agents, where generally less than 0.5 equivalent, more preferably less than 0.2 equivalent of ammonia and/or inorganic base per anionic, more preferably per carboxylic acid group is used. Tertiary amines are preferred. Tertiary amines include for example triethylamine, dimethyl amino ethyl methacrylate or oxygen containing amines. Preferably ≧60 wt %, more preferably ≧80 wt % and especially 100 wt % of the polyurethane is neutralised with an oxygen containing amine.

Preferably the oxygen containing amine is selected from the group consisting of N-ethyl morpholine; N-methyl morpholine; and $R^1(R^2)NR^3OH$ with a Mn in the range of from 88 to 118, where R, $R_2$ and $R_3$ are each independently $C_1$ to $C_4$-alkyl (for example dimethyl isopropanol amine); and preferably the oxygen containing amine is N,N-dimethylethanolamine. Suitable inorganic bases include alkali hydroxides and carbonates, for example lithium hydroxide, sodium hydroxide or potassium hydroxide. A quaternary ammonium hydroxide, for example $N^+(CH_3)_4(OH)$, can also be used. Generally a base is used which gives counter ions that may be desired for the composition. For example, preferred counter ions include $Li^+$, $Na^+$, $K^+$, $NH_4^+$ and substituted ammonium salts. When inorganic bases are used they are preferably used in combination with at least one tertiary amine as described above.

Neutralisation is usually based on the equivalent of ionic groups, and preferably the ionic water-dispersing groups in the isocyanate-terminated prepolymer are neutralised with a neutralising agent in the range of from 0.5:1 to 1.4:1, more preferably 0.6:1 to 1.4:1, most preferably 0.75:1 to 1.30:1 and especially 0.95:1 to 1.25:1. At lower levels not enough of the prepolymer is dispersed leading to an increase in sediment levels and at higher levels an increase in pH may occur, resulting in more isocyanate groups reacting with water. This results in an increase in foam and a reduction in the molecular weight of the polyurethane. Additionally at higher levels a discoloration of the resultant coating or substrate may occur especially when applied to certain types of wood such as oak.

Cationic water-dispersible groups can also be used, but are less preferred. Examples include pyridine groups, imidazole groups and/or quaternary ammonium groups which may be neutralised or permanently ionised (for example with dimethylsulphate).

Preferably the isocyanate-terminated prepolymer comprises 2 to 14 wt %, more preferably 5.0 to 13.0 wt % and especially 0.7 to 13 wt % of component (iii).

Component (iv) bears non-ionic water-dispersing groups. Preferred non-ionic water-dispersing groups are polyalkylene oxide groups where ethylene oxide is the major component. A small part of the polyethylene oxide segments can be replaced by propylene oxide segments and/or butylene oxide segments, however the polyalkylene oxide group should still contain ethylene oxide as a major component. Most preferably the non-ionic water-dispersing group comprises at least 90 wt %, more preferably at least 95 wt %, especially at least 98 wt % and most especially 100 wt % of ethylene oxide. When the water-dispersible group is polyethylene oxide, preferably the polyethylene oxide group has a molecular weight from 175 to 5000 Daltons, more preferably from 350 to 2200 Daltons, most preferably from 660 to 1600 Daltons.

Examples of preferred compounds bearing non-ionic water-dispersing groups include methoxy polyethylene glycol (MPEG) with molecular weights of for example 350, 550, 750, 1000 and 2000, as described in EP 0317258.

An excess of isocyanate-reactive polyols bearing non-ionic water-dispersing groups may result in lower König Hardness and lower chemical or stain resistance of a resultant coating. Preferably the isocyanate-terminated prepolymer comprises 0 to 7 wt %, more preferably 0 wt % of component (iv).

Examples of component (v) include but are not limited to ethylene glycol, neopentyl glycol, 1,4-cyclohexyldimethanol and less preferably water. Also included are low molecular weight polyester polyols which include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or mixtures thereof, with polycarboxylic acids, especially dicarboxylic acids or their ester-forming derivatives, for examples succinic, glutaric and adipic acids or their methyl esters, phthalic anhydrides or dimethyl terephthalate. Polyesters obtained by the polymerisation of lactones, for example caprolactone in conjunction with a polyol may also be used.

Preferably component (v) has an average of 1.8 to 2.5 isocyanate-reactive groups and more preferably component (v) has two hydroxy functional groups.

Preferably the weight average molecular weight of component (v) is in the range of from 62 to 300 and more preferably 84 to 200 g/mol.

Preferably the isocyanate-terminated prepolymer comprises 2 to 8 wt %, more preferably 3 to 6 wt % of component (v).

Examples of component (vi) include but are not limited to higher molecular weight examples of the compounds listed for component (v), such as polyesters, polyether polyols, polyesteramides, polythioethers, polycarbonates, polyacetals, polyolefins and/or polysiloxanes.

Polyesteramides may be obtained by the inclusion of amino-alcohols such as ethanolamine in polyesterification mixtures. Polyesters which incorporate carboxy groups may be used, for example polyesters where DMPA and/or DMBA is used, provided that the esterification is carried out under conditions which allow the retention of the carboxy functionality in the final polyester.

A feature of such carboxy functional polyesters is that they can contribute to the dispersibility of the isocyanate-terminated prepolymer in water, thus allowing a lower level of component (iii) to be used.

Polyether polyols which may be used include products obtained by the polymerisation of a cyclic oxide, for example a minor amount of ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Particularly preferred are polyether diols. For clarity the presence of any ethylene oxide in such polyols is not be enough for them to be considered as non-ionic water dispersing polyols.

Components (v) and (vi) may also include crosslinking groups. Crosslinking groups are well known in the art and include groups which may crosslink at ambient temperature (22±3° C.) by a number of mechanisms including but not limited to autoxidation (for example by fatty acid groups containing unsaturated bonds); Schiff base crosslinking (for example the reaction of carbonyl functional groups with carbonyl reactive amine and/or hydrazine functional groups); silane crosslinking (for example the reaction of alkoxy silane groups in the presence of water) and epoxy groups crosslinking with epoxy-reactive functional groups.

When an isocyanate-terminated prepolymer is prepared, it is conventionally formed by reacting a stoichiometric excess of the organic polyisocyanate (components (i) and (ii)) with the isocyanate-reactive compounds (components (iii), (iv), (v) and (vi)) under substantially anhydrous conditions at a temperature between about 30° C. and about 130° C. until reaction between the isocyanate groups and the isocyanate-reactive groups is substantially complete; preferably the reactants for the prepolymer are generally used in proportions corresponding to a ratio of isocyanate groups to isocyanate-reactive groups of from about 1.4:1 to about 2.0:1 and more preferably from about 1.45:1 to 1.75:1.

Preferably the practical NCO % of the prepolymer at the end of prepolymer preparation should be equal to or less than the theoretical NCO %. If the practical NCO % is greater than the theoretical NCO %, then the prepolymer reaction has not been completed which will affect the reproducibility of the dispersion ability since the amount of residual free polyols and/or isocyanates may vary. Additionally, if the prepolymer reaction has not been completed and dispersion is started the dispersability will be decreased as any unreacted polyols and free isocyanates reduce the water up take and will therefore result in more sediment.

If desired, catalysts such as dibutyltin dilaurate and stannous octoate, zirconium or titanium based catalysts may be used to assist the polyurethane formation. Preferably no catalyst is used.

Active hydrogen-containing chain extending compounds, which may be reacted with the isocyanate-terminated prepolymer include amino-alcohols, primary or secondary diamines or polyamines, hydrazine and substituted hydrazines.

Examples of such chain extending compounds useful herein include alkylene diamines such as ethylene diamine and cyclic amines such as isophorone diamine. Also compounds such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid dihydrazide, oxalic acid dihydrazide, isophthalic acid dihydrazide, hydrazides made by reacting lactones with hydrazine, bis-semi-carbazide, and bis-hydrazide carbonic esters of glycols may be useful. Water itself may be effective as an indirect chain extending compound. Another suitable class of chain extending compounds are the so-called "Jeffamine" compounds with a functionality of 2 or 3 (available from Huntsman). These are PPO or PEO-based di or tri-amines, e.g. "Jeffamine" T403 and "Jeffamine" D-400.

Preferably the ratio of active-hydrogen chain extending compound other than water to isocyanate (NCO) groups is in the range of from 0.5:1 to 1.2:1, more preferably 0.6:1 to 1.1:1, especially 0.75:1 to 1.02:1 and most preferably 0.78:1 to 0.98:1.

Where the chain extender is other than water, for example a polyamine or hydrazine, it may be added to an aqueous dispersion of the isocyanate-terminated prepolymer or preferably, it may already be present in the aqueous medium when the isocyanate-terminated prepolymer is dispersed therein.

The isocyanate-terminated prepolymer may be dispersed in water using techniques well known in the art.

Preferably, the isocyanate-terminated prepolymer is added to the water with agitation or, alternatively, water may be stirred into the isocyanate-terminated prepolymer.

The reactive diluent is added before and/or during and/or after the formation of the isocyanate-terminated prepolymer to control the viscosity. Suitable reactive diluents which may be used include mono or polyunsaturated vinyl monomers, which may be polymerised in situ to prepare a vinyl polymer. Other reactive diluents include multifunctional materials well known in the art such as multifunctional (meth)acrylate monomers, for example (meth)acrylic acid esters of di- and tri-hydroxyl alcohols (e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogues of all the above); esters of (meth) acrylic acid with monohydric and polyhydric compounds such as ethyl, butyl, hexyl, octyl, and decyl (meth)acrylates; neopentyl glycol di(meth)acrylate, trimethylolpropane tri (meth)acrylate (TMPTA), pentaerythritol tri(meth)acrylate and tetra(meth)acrylate, caprolactone (meth)acrylates, alkoxylated (meth)acrylates, glycerol (meth)acrylates, 1,4-butanediol di(meth)acrylate, 1,6-hexane diol di(meth)acrylate, 2,2-dimethyl-3-hydroxypropyl-2,2-dimethyl-3-hydroxypropionate di(meth)acrylate, isobornyl (meth)acrylate, tripropylene glycol di(meth)acrylate, urethane (meth)acrylates, (meth)acrylated epoxides and the like.

Additional vinyl monomers as described herein may also be added to the aqueous phase before and/or during and/or after dispersing the isocyanate-terminated prepolymer in water. The function of these additional vinyl monomers is not as a diluent to control the viscosity of the isocyanate-terminated prepolymer formation but to contribute to the in-situ preparation of a vinyl polymer.

All of the vinyl monomer (comprising the reactive diluent as well as the additional vinyl monomer) may be present before commencement of vinyl polymerisation, or the additional vinyl monomer may be added to the reaction medium during the course of the vinyl polymerisation (in one or more stages or continuously). For example, when the aqueous dispersion of the isocyanate-terminated prepolymer is formed in the process to make the polyurethane as described above some or all of the vinyl monomer may be added before and/or after and/or during the isocyanate-terminated prepolymer preparation prior to its dispersion into water (and therefore may act as a reactive diluent). Some or all of the vinyl monomer may have already been added to the water prior to the dispersion of the isocyanate-terminated prepolymer therein.

Preferably the reactive diluent comprises between 5 and 40%, more preferably between 5 and 35%, most preferably between 10 and 32% and especially between 15 to 30% by weight of both the isocyanate-terminated prepolymer and the reactive diluent together. Increasing the level of reactive diluent may result in an increase of the sediment content.

Preferably the reactive diluent comprises at least 80 wt %, more preferably at least 95 wt % and most preferably 100 wt % of α,β-mono-unsaturated vinyl monomers based on the total weight of vinyl monomers used.

Examples of vinyl monomers include but are not limited to 1,3-butadiene, isoprene; trifluoro ethyl (meth)acrylate (TFEMA); dimethyl amino ethyl (meth)acrylate (DMAEMA); styrene, α-methyl styrene, (meth)acrylic amides and (meth)acrylonitrile; vinyl halides such as vinyl chloride; vinylidene halides such as vinylidene chloride; vinyl ethers; vinyl esters such as vinyl acetate, vinyl propionate, vinyl laurate; vinyl esters of versatic acid such as VeoVa 9 and VeoVa 10 (VeoVa is a trademark of Resolution); heterocyclic vinyl compounds; alkyl esters of mono-olefinically unsaturated dicarboxylic acids such as di-n-butyl maleate and di-n-butyl fumarate and in particular, esters of acrylic acid and methacrylic acid of formula $CH_2=CR^4-COOR^5$ wherein $R^4$ is H or methyl and $R^5$ is optionally substituted alkyl or cycloalkyl of 1 to 20 carbon atoms (more preferably 1 to 8 carbon atoms) examples of which are methyl methacrylate, ethyl methacrylate, n-butyl (meth)acrylate (all isomers), octyl (meth)acrylate (all isomers), 2-ethylhexyl (meth)acrylate, isopropyl (meth)acrylate and n-propyl (meth)acrylate. Preferred monomers of formula $CH_2=CR^4-COOR^5$ include butyl (meth)acrylate (all isomers), methyl (meth) acrylate, octyl (meth)acrylate (all isomers) and ethyl (meth) acrylate. Particularly preferably the reactive diluent comprises 40 to 100 wt % of vinyl monomer selected from the group consisting of methylmethacrylate and ethylmethacrylate. Most preferably the reactive diluent added before and/or during and/or after the formation of the iscocyante-terminated prepolymer to control the viscosity comprises <45 wt %, more preferably <40 wt % of styrene and styrene based vinyl monomers (such as α-methyl styrene). The presence of hydrophobic monomers such as styrene decreases the ease of dispersion of the prepolymer in water which results in an increase in the sediment content.

The vinyl monomers may include vinyl monomers carrying functional groups such as crosslinker groups and/or water-dispersing groups. Such functionality may be introduced directly in the vinyl polymer by free-radical polymerisation, or alternatively the functional group may be introduced by a reaction of a reactive vinyl monomer, which is subsequently reacted with a reactive compound carrying the desired functional group.

Vinyl monomers providing ionic or potentially ionic water-dispersing groups which may be used as additional vinyl monomers include but are not limited to (meth)acrylic acid, itaconic acid, maleic acid, citraconic acid and styrenesulphonic acid.

Preferably the level of vinyl monomers providing ionic or potentially ionic water-dispersing groups is between 0 to 5 wt %, more preferably between 0 and 1 wt % and most preferably 0 wt % of the total level of vinyl monomers used.

Preferably the resultant vinyl polymer has an acid value in the range of from 0 to 20, more preferably 0 to 10 and especially 0 mgKOH/g.

Vinyl monomers providing non-ionic water-dispersing groups include alkoxy polyethylene glycol (meth)acrylates, preferably having a number average molecular weight of from 350 to 3000. Examples of such monomers which are commercially available include ω-methoxypolyethylene glycol (meth)acrylates.

Examples of suitable vinyl monomers providing crosslinking groups include acrylic and methacrylic monomers having at least one free carboxyl or hydroxyl group (if used as an additional vinyl monomer), epoxy, acetoacetoxy or carbonyl group, such as acrylic acid and methacrylic acid, glycidyl acrylate, glycidyl methacrylate, aceto acetoxy ethyl methacrylate, allyl methacrylate, tetraethylene glycol dimethacrylate, divinyl benzene and diacetone acrylamide.

Preferably the weight average molecular weight (Mw) of the resultant vinyl polymer is at least 60,000 Daltons, more preferably in the range of from 100,000 to 6,000,000 Daltons and most preferably in the range of from 150,000 to 2,500,000 Daltons.

The Tg of a polymer herein stands for the glass transition temperature and is well known to be the temperature at which a polymer changes from a glassy, brittle state to a rubbery state. Tg values of polymers may be determined experimentally using techniques such as Differential Scanning Calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/Tg = W_1/Tg_1 + W_2/Tg_2 + \ldots W_n/Tg_n$".

The calculated Tg in Kelvin may be readily converted to ° C.

The calculated Tg of the resultant vinyl polymer in the polyurethane vinyl hybrid is preferably in the range of from 20 to 120° C. and more preferably 30 to 110° C. If the resultant vinyl polymer comprises more than one stage, then preferably the Tg is the calculated Tg of the average resultant vinyl polymer and is in the range of from −20 to 125° C., more preferably 5 to 120° C. and most preferably 30 to 110° C.

The weight average particle size, assuming a substantially spherical particle shape, of the particles in the polyurethane or polyurethane vinyl hybrid dispersion is preferably less than 500 nm, more preferably in the range of from 20 to 300 nm and most preferably in the range of from 20 to 200 nm. More preferably at least 60 wt %, more preferably at least 75 wt % and most preferably at least 85 wt % of the particles have a particle size less than 500 nm. A disadvantage of a particle size greater than 500 nm is that the sediment content may be increased resulting in unacceptable processing.

The polymerisation of the vinyl monomers may be carried out as a batch, step-wise, gradient or as a semi-continuous polymerisation process to make a single or a multistage vinyl polymer.

Free-radical polymerisation of vinyl monomers will require the use of a free-radical-yielding initiator to initiate the vinyl polymerisation. Suitable free-radical-yielding initiators include hydrogen peroxide; percarbonates; organic peroxides, such as acyl peroxides including benzoyl peroxide, alkyl hydroperoxides such as t-butyl hydroperoxide (tB-HPO) and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Metal compounds such as Fe.EDTA (EDTA is ethylene diamine tetracetic acid) may also be usefully employed as part of the redox initiator system. Azo functional initiators may also be used. Preferred azo initiators include azobis(isobutyronitrile) and 4,4'-azobis(4-cyanovaleric acid). The amount of initiator or initiator system used is conventional, e.g. within the range 0.05 to 6 wt % based on the total weight of vinyl monomers used. Preferred initiators include azobis(isobutyronitrile) and/or 4,4'-azobis(4-cyanovaleric acid) and redox couples that are active between 30° C. and 75° C. Most preferred initiators are redox couples that are active between 30° C. and 75° C. such as tBHPO and isoascorbic acid.

Molecular weight control may be provided by catalytic chain transfer agents or may be provided by using chain transfer agents such as mercaptans and halogenated hydrocarbons, for example mercaptans such as n-dodecylmercaptan, n-octylmercaptan, t-dodecylmercaptan, mercaptoethanol, iso-octyl thioglycolate, $C_2$ to $C_8$ mercapto carboxylic acids and esters thereof and halogenated hydrocarbons such as carbon tetrabromide and bromotrichloromethane.

Combinations of conventional chain transfer agents and catalytic chain transfer agents may also be used.

Surfactants can be utilised in order to assist in the dispersion of the polyurethane and/or vinyl polymer in water (even if they are self-dispersible). Suitable surfactants include but are not limited to conventional anionic, cationic and/or non-ionic surfactants and mixtures thereof. Anionic and/or non-ionic surfactants are preferred. The amount of surfactant used is preferably 0 to 6% by weight, more preferably 0 to 3% by weight and especially 0.1 to 2% by weight based on the weight of the solids in the aqueous composition of the invention.

In a third embodiment of the present invention there is provided a process for making an aqueous composition with a sediment content ≦5%, comprising a polyurethane dispersion and containing ≦5 wt % of 1-methyl-2-pyrrolidinone by weight of the polyurethane, wherein the polyurethane has an acid value in the range of from 25 to 65 mgKOH/g, and where the process is carried out in steps comprising:

I: reacting in the presence of (a) ≦5 wt % of 1-methyl-2-pyrrolidinone by weight of polyurethane and (b) at least one reactive diluent;
  (i) 36 to 60 wt % of at least one aromatic polyisocyanate;
  (ii) 0 to 30 wt % of at least one aliphatic polyisocyanate;
  (iii) 0 to 15 wt % of at least one isocyanate-reactive polyol bearing ionic and/or potentially ionic water-dispersing groups with a weight average molecular weight ≦500 g/mol;
  (iv) 0 to 10 wt % of at least one isocyanate-reactive polyol bearing non-ionic water-dispersing groups;
  (v) 0 to 15 wt % of at least one isocyanate-reactive polyol with a weight average molecular weight ≦500 g/mol not comprised by (iii) or (iv);
  (vi) 20 to 58 wt % of at least one isocyanate-reactive polyol not comprised by (iii), (iv) or (v);
  where (i)+(ii)+(iii)+(iv)+(v)+(vi) add up to 100 wt %;
  where the NCO/OH ratio is in the range of from 1.2:1 to 2.5:1 to form an isocyanate-terminated prepolymer;
II: neutralising the isocyanate-terminated prepolymer with a neutralising agent;
III: forming an aqueous dispersion of the isocyanate-terminated prepolymer in water;
IV: reacting the isocyanate-terminated prepolymer with at least one active hydrogen chain-extending compound to form the polyurethane;
  where the active hydrogen/NCO ratio is in the range of from 0.4:1 to 1.3:1;
VI: polymerising the reactive diluent.

In a fourth embodiment of the present invention there is provided a process for making an aqueous composition with a sediment content ≦5%, comprising a polyurethane vinyl hybrid dispersion and containing ≦0.5 wt % of 1-methyl-2-pyrrolidinone by weight of the composition, wherein the polyurethane has an acid value in the range of from 25 to 65 mgKOH/g, and where the process is carried out in steps comprising:

I: reacting in the presence of (a) ≦5 wt % of 1-methyl-2-pyrrolidinone by weight of polyurethane and (b) at least one reactive diluent;
  (i) 36 to 60 wt % of at least one aromatic polyisocyanate;
  (ii) 0 to 30 wt % of at least one aliphatic polyisocyanate;
  (iii) 0 to 15 wt % of at least one isocyanate-reactive polyol bearing ionic and/or potentially ionic water-dispersing groups with a weight average molecular weight ≦500 g/mol;
  (iv) 0 to 10 wt % of at least one isocyanate-reactive polyol bearing non-ionic water-dispersing groups;
  (v) 0 to 15 wt % of at least one isocyanate-reactive polyol with a weight average molecular weight ≦500 g/mol not comprised by (iii) or (iv);
  (vi) 20 to 58 wt % of at least one isocyanate-reactive polyol not comprised by (iii), (iv) or (v);
  where (i)+(ii)+(iii)+(iv)+(v)+(vi) add up to 100 wt %;
  where the NCO/OH ratio is in the range of from 1.2:1 to 2.5:1 to form an isocyanate-terminated prepolymer;
II: neutralising the isocyanate-terminated prepolymer with a neutralising agent;
III: forming an aqueous dispersion of the isocyanate-terminated prepolymer in water;
IV: reacting the isocyanate-terminated prepolymer with at least one active hydrogen chain-extending compound to form the polyurethane;
  where the active hydrogen/NCO ratio is in the range of from 0.4:1 to 1.3:1;
V: adding additional vinyl monomer; and
VI: polymerising the reactive diluent and vinyl monomer added in step V.

The process steps may be carried out in a number of variations. For example step II may be carried out simultaneously with or before step III. Steps II, III and IV may be carried out simultaneously. Steps II, III, IV and V may be carried out simultaneously. Steps II, III, IV, V and VI may be carried out simultaneously. Step V may be carried out at any phase of the process. Preferably step II is not carried out after step III or step IV. Preferably step III is not carried out after Step IV. Preferably Step VI is not carried out before Step III. Step VI may be carried out during and/or after Step III. Step II may be carried out simultaneously with step III and the neutralising agent is substantially present in the water.

Step II, step III and/or step IV may be carried out by means of an in-line mixer. If an in-line mixer is used, preferably at least Step II is carried out by means of an in-line mixer. The time between step III and step IV is preferably less than 40 minutes, more preferably less than 15 minutes, especially less than 5 minutes and most preferably Step III and Step IV are carried out simultaneously. Preferably at least 50 wt % of the active-hydrogen chain extending compound is present in the water before completion of step III. Step VI may be carried out by means of a batch polymerisation process.

The aqueous composition of the invention typically has a solids content of from about 20 to 55% by weight, more usually from 25 to 45% by weight and especially from 29 to 39% by weight.

The aqueous composition of the invention is particularly useful for providing the principle component of coating compositions (e.g. protective or decorative coating compositions) especially for coating compositions for floors, for which purpose it may be further diluted with water and/or organic solvents, or it may be supplied in a more concentrated form by evaporation of water and/or organic components of the liquid medium. As a coating composition, it may be applied to a variety of substrates including wood (in particular porous wood), board, metals, stone, concrete, glass, cloth, leather, paper plastics, foam and the like, by any conventional method including brushing, dipping, flow coating, spraying and the like. The aqueous composition once applied may be allowed to dry naturally at ambient temperature or the drying process may be accelerated by the application of heat.

The aqueous composition of the invention may contain conventional ingredients, some of which have been mentioned above; examples include pigments (for example titanium dioxide, iron oxide, chromium based compounds and/or metal pthalocyanine compounds), dyes, emulsifiers, surfactants, plasticisers, thickeners, heat stabilisers, matting agents such as silica, levelling agents, anti-cratering agents, fillers, sedimentation inhibitors, UV absorbers, antioxidants, drier salts, water-soluble and/or water-insoluble co-solvents, wetting agents, defoamers, fungicides, bacteriocides, waxes and the like introduced at any stage of the production process or subsequently. It is possible to include an amount of antimony oxide in the dispersions to enhance the fire retardant properties.

Optionally the isocyanate-terminated prepolymer may be dispersed in a preformed polymer dispersion including vinyl polymer, polyurethane, alkyd, polyurethane vinyl hybrid dispersions and mixtures thereof.

The aqueous composition of the invention preferably contains less than 15 wt % and more preferably less than 10 wt % of organic co-solvents based on the weight of the composition. The aqueous coating composition of the invention may be substantially co-solvent-free. By a substantially co-solvent-free aqueous composition is meant that the composition must contain less than 1.5 wt % of organic co-solvents based on total polymer solids, more preferably less than 0.5 wt %, and most preferably no organic co-solvent at all.

For substantially co-solvent-free aqueous compositions, which are film forming at ambient temperature it has been found that an addition of 2 to 15 wt %, more preferably 4 to 12 wt % and most preferably 6 to 10 wt % of an organic co-solvent Q based on polymer solids can give an improved level of chemical and stain resistance.

Organic co-solvent Q may optionally be added at any stage of the isocyanate-terminated prepolymer or polyurethane or polyurethane vinyl hybrid preparation to control the viscosity.

Organic co-solvent Q has an evaporation rate from 0.001 to 0.1, more preferably from 0.002 to 0.05 and most preferably from 0.002 to 0.02, relative to butyl acetate with an evaporation rate of 1.0.

Preferably the organic co-solvent Q is selected from the group consisting of oxygen containing co-solvents. Especially preferred are ethyldiglycol, butyl glycol, butyldiglycol, Dowanol DPnB and Dowanol DPM (Dowanol is a trade mark of Dow).

If desired the aqueous composition of the invention can be used in combination with other polymer compositions which are not according to the invention.

König Hardness as used herein is a standard measure of hardness, this being a determination of how the viscoelastic properties of a film formed from the dispersion slows down a swinging motion deforming the surface of the film and is measured according to DIN 53157 using an Erichsen hardness equipment.

Preferably the aqueous composition of the invention, and more preferably the aqueous composition of the second embodiment of the invention, when in the form of a film has a König Hardness $\geq 120s$, more preferably $\geq 130s$, most preferably $\geq 140s$, especially $\geq 160s$ and especially $\geq 165s$.

Elongation at break as used herein is a measure of the elongation at break of an unsupported film (i.e. not on a substrate) and is measured using an Instron tensile device and is defined as the maximum elongation until break under a constant strain rate.

Preferably the aqueous composition of the invention, and more preferably the aqueous composition of the second embodiment of the invention, when in the form of a film has an elongation at break $\geq 50\%$ and a König Hardness $\geq 120s$.

Preferably the aqueous composition of the invention containing $\leq 2$ wt % and more preferably 0 wt % of a co-solvent by weight of the composition, has a minimum film forming temperature $\leq 50°$ C., more preferably $\leq 28°$ C. and especially $\leq 23°$ C.

Most preferably the aqueous composition of the invention, and more preferably the aqueous composition of the second embodiment of the invention, containing $\leq 2$ wt % of a co-solvent by weight of the composition has a minimum film forming temperature $\leq 50°$ C. and when in the form of a film has a König Hardness $\geq 120s$.

The sediment content is determined after preparation of the polyurethane composition but before any filtration is carried out.

The aqueous composition of the invention preferably has a sediment content of $\leq 2.5\%$, more preferably $\leq 1\%$, more preferably $\leq 0.5\%$ and especially $\leq 0.35\%$.

It is also well known that polyurethanes based substantially on aromatic isocyanates have a tendency to yellow over time. Surprisingly we have found that polyurethane dispersion of the invention demonstrated a significant reduction in yellowing when compared to a similar aromatic polyurethane with high levels of NMP. The yellowness may be determined by measuring the colour co-ordinates of a film of a composition using a Dr Lange Spectro-pen (type LMG161), and 'b' is a measure of yellowness (+b) or blueness (−b). The coordinates approach zero for neutral colours such as white, grey or black. The higher the values are, the more saturated a colour is.

The change in yellowness of the resultant film was determined by measuring (w) the yellowness of the substrate before UV exposure, (x) the yellowness of the film coated in the substrate before UV exposure, (y) the yellowness of the substrate after UV exposure and (z) the yellowness of the film coated on the substrate after UV exposure. Yellowing ($\Delta b$) is defined as $((z)−(y))−((x)−(w))$.

Preferably the value of $\Delta b$ for the composition of the invention is $\leq 3.0$ and more preferably $\leq 2.7$.

In a fourth embodiment of the present invention there is provided a coating on a substrate obtained from an aqueous composition as described herein.

In a fifth embodiment of the present invention is provided a method for coating a substrate with an aqueous composition as described herein.

In a sixth embodiment of the present invention there is provided the use of an aqueous composition as described herein in an aqueous coating composition.

In a seventh embodiment of the present invention there is provided the use of an aqueous composition as described herein for coating floors.

The present invention is now illustrated but in no way limited by reference to the following examples. Unless otherwise specified all parts, percentages and ratios are on a weight basis.

| Components and abbreviations used: | |
|---|---|
| MDI = | Isomer mixture of 4,4'-diphenylmethane diisocyanate and 2,4'-diphenylmethane diisocyanate available from Huntsman |
| TDI = | Isomer mixture of 2,4-toluene diisocyanate and 2,6-toluene diisocyanate available from Huntsman |
| Rubinate 9279 = | Blend of 41 wt % toluene diisocyanate and 59 wt % diphenylmethane diisocyanate |
| IPDI = | Isophorone diisocyanate available from Bayer |
| DMPA = | Dimethylolpropionic acid available from Perstorp polyols |
| CHDM = | 1,4-Cyclohexanedimethanol available from Eastman Chemical bv |
| PPG1000 = | Polypropylene glycol 1000, OH-number = 110.5 mg KOH/g available from Dow Benelux |
| Terathane 1000 = | Polytetramethylene ether glycol, OH-number = 112.5 mg KOH/g available from Du Pont de Nemours |
| Priplast 3192 = | Polyester diol, OH-number = 56.0 mg KOH/g available from Uniqema Chemie bv |
| PEC90 = | Polyester diol, OH-number = 120 mg KOH/g available from Durez Europe |
| DMEA = | N,N-Dimethylethanolamine available from Chemproha bv |
| EDA = | Ethylene diamine available from Delamine bv |
| Hydrazine = | Hydrazine hydrate available from Bayer AG |
| Abex2545 = | Nonionic surfactant available from Rhodia |
| Disponyl AFX4060 = | Nonionic surfactant available from Cognis |
| Disponyl AFX4030 = | Nonionic surfactant available from Cognis |
| MMA = | Methyl methacrylate available from ECEM European Chemical Marketing bv |
| STY = | Styrene available from Dow Benelux nv |
| BA = | n-Butyl acrylate available from BASF UK Ltd |
| BMA = | n-Butyl methacrylate available from Arkema Nederland bv |
| 2-EHA = | 2-Ethylhexyl acrylate available from Dow Benelux nv |
| lonol cp = | 2,6-Di-tert-butyl-4-methylphenol available from |

-continued

| Components and abbreviations used: | |
|---|---|
| IAA = | Avecia Inc<br>Isoascorbic acid available from Brenntag Volkers Benelux by |
| tBHPO = | tert-Butyl hydroperoxide, available from Akzo Nobel Chemicals by |
| FeEDTA = | Iron-ethylenediaminetetracetic acid complex, 1% in water |
| Dowanol DPM = | Di(propylene glycol) monomethyl ether available from Dow Benelux |
| MPEG = | Methoxy polyethylene glycol |
| DEA = | Diethanolamine |
| NCO = | Isocyanate group |
| MFFT = | Minimum film forming temperature |
| UV = | Ultra violet |

The specifications for all of the Examples are given in Table 1 below.

EXAMPLE I

Stage 1: Nonionic diol: To 1459.5 g of MPEG 750 ($M_w$=740 g/mole), 343.8 g of 2,4-toluene diisocyanate was added over a 90 minute period at 40-45 °C. At the end of the reaction, the isocyanate content was 4.60%. The system was cooled to 25° C. and 196.7 g of DEA was added. The resultant nonionic diol had an OH number of 103 mg KOH/g.

Stage 2: Polyurethane dispersion: A 2000 cm³ flask equipped with a thermometer and overhead stirrer was charged with Rubinate 9279 (511.9 g), Ionol cp (0.48 g), MMA (240.0 g) and STY (240.0 g). Then a mixture containing CHDM (65.74 g), DMPA (95.20 g), the dispersing non-ionic diol prepared in stage 1 (56.0 g) and Terathane 1000 (391.1 g) was added over a period of 60 minutes. The reaction was allowed to exotherm to 50° C. After the exotherm was complete the reaction was kept at 85° C. for 2 hours. The NCO-content of the resultant isocyanate-terminated prepolymer was 3.98% (theoretical 4.23%).

A dispersion of the isocyanate-terminated prepolymer was made by feeding 500 g of the isocyanate-terminated prepolymer over 1 hour to deionised water (1064 g) containing DMEA (21.7 g), 15.2% hydrazine (46.9 g) and ABEX2545 (10.5 g). The isocyanate-terminated prepolymer temperature during dispersion was kept at 50° C. and the dispersion temperature was controlled between 25 to 30° C.

Stage 3: Polyurethane Vinyl (50/50) Hybrid Dispersion:

To 1430 g of the dispersion prepared in Stage 2 was charged deionised water (386.2 g), MMA (26.1 g), BA (57.9 g) and STY (90.1 g). After the addition of the additional monomers the dispersion was allowed to stir for 1 hour at ambient temperature. To the resultant dispersion was added a 10% tBHPO solution in water (7.9 g) and a 1% FeEDTA solution in water (4.0 g) followed by feeding in a 1% IAA solution in water (60.9 g) over a period of 45 minutes. The resultant polyurethane vinyl hybrid dispersion was filtered through 75 micron filter cloths.

EXAMPLE II

Stage 1: Polyurethane dispersion: A 2000 cm³ flask equipped with a thermometer and overhead stirrer was charged with Rubinate 9279 (562.4 g), Ionol cp (0.4 g) and MMA (369.3 g). Then a mixture containing CHDM (48.4), DMPA (125.5 g) and Terathane 1000 (494.4 g) was added over a period of 60 minutes. The reaction was allowed to exotherm to 50° C. After the exotherm was complete the reaction was kept at 85° C. for 2 hours. The NCO-content of the isocyanate-terminated prepolymer was 4.47% (theoretical 4.64%).

A dispersion of the isocyanate-terminated prepolymer was made by feeding 300 g of the isocyanate-terminated prepolymer at 50° C. over 1 hour to deionised water (851.6 g) containing DMEA (17.20 g), 15.2% hydrazine (29.58 g) and Disponyl AFX4060 (5.77 g). The isocyanate-terminated prepolymer temperature during dispersion was kept at 50° C. and the dispersion temperature was controlled between 25 to 30° C.

Stage 2: Polyurethane vinyl (50/50) hybrid dispersion: To the dispersion prepared in Stage 1 (1204.2 g) was charged BA (43.9 g) and STY (117.7 g). After the addition of the additional vinyl monomers the dispersion was allowed to stir for 1 hour at ambient temperature. To the resultant dispersion was then added a 10% tBHPO solution in water (6.0 g) and a 1% FeEDTA solution in water (3.0 g) followed by feeding a 1% IAA solution in water (46.2 g) over a period of 45 minutes. The resultant polyurethane vinyl hybrid dispersion was filtered through 75 micron filter cloths.

EXAMPLE III

Stage 1: Polyurethane dispersion: A 2000 cm³ flask equipped with a thermometer and overhead stirrer was charged with DMPA (125.5 g), CHDM (48.5 g), PPG1000 (574.2 g), MMA (369.2 g), TDI (482.5 g) and Ionol cp (0.4). The reaction was allowed to exotherm to 50° C. After the exotherm was complete the reaction was kept at 85° C. for 2 hours. The NCO-content of the isocyanate-terminated prepolymer was 4.80% (theoretical 4.85%).

A dispersion of the isocyanate-terminated prepolymer was made by feeding 275 g of the isocyanate-terminated prepolymer at 50° C. over 1 hour to deionised water (782 g) containing DMEA (15.77 g), 15.2% hydrazine (31.43 g) and of Disponyl AFX4060 (10.57 g). The isocyanate-terminated prepolymer temperature during dispersion was kept at 50° C. and the dispersion temperature was controlled between 25 to 30° C.

Stage 2: Polyurethane vinyl (30/70) hybrid dispersion: To the dispersion prepared in Stage 1 (540 g) was charged deionised water (321.3 g), BA (47.3 g), MMA (42.7 g) and STY (127.0 g). After the addition of the additional vinyl monomers the dispersion was allowed to stir for 1 hour at ambient temperature. To the resultant dispersion was then added a 10% tBHPO solution in water (6.5 g) and a 1% FeEDTA solution in water (3.2 g) followed by feeding a 2.5% IAA solution in water (19.9 g) over a period of 45 minutes. The resultant polyurethane vinyl hybrid dispersion was filtered through 75 micron filter cloths.

EXAMPLE IV

Stage 1: Polyurethane dispersion: A 2000 cm³ flask equipped with a thermometer and overhead stirrer was charged with DMPA (96.0 g), CHDM (32.0 g), PPG1000 (622.1 g), MMA (320.0 g), Rubinate 9279 (529.9 g) and Ionol cp (0.3 g). The reaction was allowed to exotherm to 50° C. After the exotherm was complete the reaction was kept at 85° C. for 2 hours. The NCO-content of the isocyanate-terminated prepolymer was 4.48% (theoretical 4.92%).

A dispersion of the isocyanate-terminated prepolymer was made by feeding 375.0 g of the isocyanate-terminated prepolymer at 50° C. over 1 hour to deionised water (886.6 g) containing Dowanol DPM (79.0 g), DMEA (16.4 g), 15.2% hydrazine (37.9 g) and Abex2545 (18.0 g). The isocyanate-terminated prepolymer temperature during dispersion was kept at 50° C. and the dispersion temperature was controlled between 25 to 30° C.

Stage 2: Polyurethane vinyl (60/40) hybrid dispersion: To the dispersion prepared in Stage 1 (1414.7 g) was charged MMA (25.0) and STY (100.0 g). After the addition of the additional vinyl monomers the dispersion was allowed to stir for 1 hour at ambient temperature. To the resultant dispersion was then added a 10% tBHPO solution in water (5.2 g) and a 1% FeEDTA solution in water (2.6 g) followed by feeding a 2.5% IAA solution in water (16.0 g) over a period of 45 minutes. The resultant polyurethane vinyl hybrid dispersion was filtered through 75 micron filter cloths.

EXAMPLE V

Stage 1: Polyurethane dispersion: A 2000 cm$^3$ flask equipped with a thermometer and overhead stirrer was charged with DMPA (122.5 g), Priplast 3192 (489.2 g), MMA (420.0 g), Rubinate 9279 (368.4 g) and Ionol cp (0.4). The reaction was allowed to exotherm to 50° C. After the exotherm was complete the reaction was kept at 85° C. for 2 hours. The NCO-content of the isocyanate-terminated prepolymer was 3.22% (theoretical 3.47%).

A dispersion of the isocyanate-terminated prepolymer was made by feeding 500 g of the isocyanate-terminated prepolymer at 50° C. over 1 hour to deionised water (956.9 g) containing DMEA 32.0 g, 15.2% hydrazine (36.3 g) and Abex2545 (21.0 g). The isocyanate-terminated prepolymer temperature during dispersion was kept at 50° C. and the dispersion temperature was controlled between 25 to 30° C.

Stage 2: Polyurethane vinyl (30/70) hybrid dispersion: To the dispersion prepared in Stage 1 (1549.0 g) was charged a 10% tBHPO solution in water (3.90 g) and a 1% FeEDTA solution in water (2.0 g) followed by feeding a 2.5 IAA solution in water (12.0 g) over a period of 45 minutes. The resultant polyurethane vinyl hybrid dispersion was filtered through 75 micron filter cloths.

EXAMPLE VI

Stage 1: Polyurethane dispersion: A dispersion of an isocyanate-terminated prepolymer was made by feeding 350 g of the isocyanate-terminated prepolymer described in Example V, Stage 1 at 50° C. over 1 hour to 791.0 g of deionised water containing DMEA (22.4 g), 15.2% hydrazine (25.4 g) and Abex2545 (14.7 g). The isocyanate-terminated prepolymer temperature during dispersion was kept at 50° C. and the dispersion temperature was controlled between 25 to 30° C.

Stage 2: Polyurethane vinyl (50/50) hybrid dispersion: To the dispersion prepared in Stage 1 (1204.6 g) was charged 2-EHA (49.0 g) and STY (91.0 g). After the addition of the additional vinyl monomers the dispersion was allowed to stir for 1 hour at ambient temperature. To the resultant dispersion was then added a 10% tBHPO solution in water (6.4 g) and a 1% FeEDTA solution in water (3.2 g) followed by feeding a 2.5% IM solution in water (19.6 g) over a period of 45 minutes. The resultant polyurethane vinyl hybrid dispersion was filtered through 75 micron filter cloths.

EXAMPLE VII

Stage 1: Polyurethane dispersion: A dispersion of the isocyanate-terminated prepolymer was made by feeding 375.0 g of the isocyanate-terminated prepolymer prepared as described in Example IV stage 1 at 50° C. over 1 hour to deionised water (1087.4 g) containing Dowanol DPM (79.0 g), DMEA (16.4 g), EDA (10.8 g) and Abex2545 (18.0 g). The isocyanate-terminated prepolymer temperature during dispersion was kept at 50° C. and the dispersion temperature was controlled between 25 to 30° C.

Stage 2: Polyurethane vinyl (60/40) hybrid dispersion: To the dispersion prepared in Stage 1 (1506.6 g) was charged BA (25.0) and STY (100.0 g). After the addition of the additional vinyl monomers the dispersion was allowed to stir for 1 hour at ambient temperature. To the resultant dispersion was then added a 10% tBHPO solution in water (5.2 g) and a 1% FeEDTA solution in water (2.6 g) followed by feeding a 2.5% IM solution in water (16.0 g) over a period of 45 minutes. The resultant polyurethane vinyl hybrid dispersion was filtered through 75 micron filter cloths.

EXAMPLE VIII

Stage 1: Polyurethane dispersion: A 1000 cm$^3$ flask equipped with a thermometer and overhead stirrer was charged with DMPA (48.0 g), CHDM (14.4 g), Priplast 3192 (240.6 g), MMA (120.0 g), TDI (177.04 g) and Ionol cp (0.1). The reaction was allowed to exotherm to 50° C. After the exotherm was complete the reaction was kept at 85° C. for 2 hours. The NCO-content of the isocyanate-terminated prepolymer was 5.73% (theoretical 6.15%).

A dispersion of the isocyanate-terminated prepolymer was made by feeding 500.0 g of the isocyanate-terminated prepolymer at 50° C. over 1 hour to deionised water (955.9 g) containing DMEA (29.2 g), 15.2% hydrazine (63.2) g and Disponyl AFX4060 (20.0 g). The isocyanate-terminated prepolymer temperature during dispersion was kept at 50° C. and the dispersion temperature was controlled between 25 to 30° C.

Stage 2: Polyurethane vinyl (80/20) hybrid dispersion: To the dispersion prepared in Stage 1 (1571.2 g) was charged a 10% tBHPO solution in water (2.6 g) and a 1% FeEDTA solution in water (1.3 g) followed by feeding a 2.5% IAA solution in water (8.0 g) over a period of 45 minutes. The resultant polyurethane vinyl hybrid dispersion was filtered through 75 micron filter cloths.

EXAMPLE IX

Stage 1: Polyurethane dispersion: A 2000 cm$^3$ flask equipped with a thermometer and overhead stirrer was charged with DMPA (91.0 g), CHDM (45.5 g), Terathane 1000 (343.6 g), MMA (390.0 g), Rubinate 9279 (343.9 g), IPDI (86.0 g) and Ionol cp (0.4). The reaction was allowed to exotherm to 50° C. After the exotherm was complete the reaction was kept at 88° C. for 2 hours. The NCO-content of the isocyanate-terminated prepolymer was 3.96% (theoretical 4.33%).

A dispersion of the isocyanate-terminated prepolymer was made by feeding 580.0 g of the isocyanate-terminated prepolymer at 50° C. over 45 min to deionised water (1113.6 g) containing DMEA (29.7 g), 15.2% hydrazine (50.7 g) and Disponyl AFX4030 (40.6 g). The isocyanate-terminated prepolymer temperature during dispersion was kept at 50° C. and the dispersion temperature was controlled between 25 to 30° C.

Stage 2: Polyurethane vinyl (70/30) hybrid dispersion: To the dispersion prepared in Stage 1 (800.0 g) was charged a 10% tBHPO solution in water (2.0 g) and a 1% FeEDTA solution in water (1.0 g) followed by feeding a 2.5% IAA solution in water (6.1 g) over a period of 45 minutes. The resultant polyurethane vinyl hybrid dispersion was filtered through 75 micron filter cloths.

EXAMPLE X

Stage 1: Polyurethane dispersion: A dispersion of the isocyanate-terminated prepolymer was made by feeding 580.0 g of the isocyanate-terminated prepolymer described in Example IX at 50° C. over 1 hour to deionised water (1113.6 g) containing DMEA (29.7 g), 15.2% hydrazine (50.7 g) and Disponyl AFX4030 (40.6 g). The isocyanate-terminated prepolymer temperature during dispersion was kept at 50° C. and the dispersion temperature was controlled between 25 to 30° C.

Stage 2: Polyurethane vinyl (50/50) hybrid dispersion: To the dispersion prepared in Stage 1 (1000.0 g) was charged BMA (100.0) and STY (27.2 g). After the addition of the additional vinyl monomers the dispersion was allowed to stir for 1 hour at ambient temperature. To the resultant dispersion was then added a 10% tBHPO solution in water (5.8 g) and a 1% FeEDTA solution in water (2.9 g) followed by feeding a 2.5% IAA solution in water (17.8 g) over a period of 45 minutes. The resultant polyurethane vinyl hybrid dispersion was filtered through 75 micron filter cloths.

EXAMPLE XI

Stage 1: Polyurethane dispersion: A dispersion of the isocyanate-terminated prepolymer was made by feeding 358.0 g of the isocyanate-terminated prepolymer described in Example IX at 50° C. over 1 hour to deionised water (942.6 g) containing n-methylmorpholine (24.6 g), 15.2% hydrazine (31.3 g) and Disponyl AFX4030 (25.1 g). The isocyanate-terminated prepolymer temperature during dispersion was kept at 50° C. and the dispersion temperature was controlled between 25 to 30° C.

Stage 2: Polyurethane vinyl (50/50) hybrid dispersion: To the dispersion prepared in Stage 1 (1390.2 g) was charged BMA (112.50 g) and STY (31.1 g). After the addition of the additional vinyl monomers the dispersion was allowed to stir for 1 hour at ambient temperature. To the resultant dispersion was then added a 10% tBHPO solution in water (6.5 g) and a 1% FeEDTA solution in water (3.3 g) followed by feeding a 2.5% IAA solution in water (20.1 g) over a period of 45 minutes. The resultant polyurethane vinyl hybrid dispersion was filtered through 75 micron filter cloths.

EXAMPLE XII

Stage 1: Polyurethane dispersion: A 3000 $cm^3$ flask equipped with a thermometer and overhead stirrer was charged with CHDM (76.8), DMPA (192.0 g), Terathane 1000 (902.2 g), TDI (749.1 g), Ionol cp (0.3) and MMA (480.0 g). The reaction was allowed to exotherm to 50° C. After the exotherm was complete the reaction was kept at 85° C. for 2 hours. The NCO-content of the isocyanate-terminated prepolymer was 4.87% (theoretical 5.02%).

A dispersion of the isocyanate-terminated prepolymer was made by feeding 550.0 g of the isocyanate-terminated prepolymer at 50° C. over 1 hour to deionised water (1120.8 g) containing DMEA (32.2 g), EDA (16.3 g) and Disponyl AFX4060 (22.0 g). The isocyanate-terminated prepolymer temperature during dispersion was kept at 60° C. and the dispersion temperature was controlled between 25 to 30° C.

Stage 2: Polyurethane vinyl (80/20) hybrid dispersion: To the dispersion prepared in Stage 1 (1740.0 g) was added a 10% tBHPO solution in water (2.9 g) and a 1% FeEDTA solution in water (1.4 g) followed by feeding a 2.5% IAA solution in water (8.8 g) over a period of 45 minutes. The resultant polyurethane vinyl hybrid dispersion was filtered through 75 micron filter cloths.

EXAMPLE XIII

Stage 1: Polyurethane dispersion: A 1000 $cm^3$ flask equipped with a thermometer and overhead stirrer was charged with CHDM (19.2), DMPA (48.0), PEC90 (191.4 g), Rubinate 9279 (221.4 g), Ionol cp (0.1) and MMA (120.0 g). The reaction was allowed to exotherm to 50° C. After the exotherm was complete the reaction was kept at 85° C. for 2 hours. The NCO-content of the isocyanate-terminated prepolymer was 4.45% (theoretical 4.87%).

A dispersion of the isocyanate-terminated prepolymer was made by feeding 500.0 g of the isocyanate-terminated prepolymer at 60° C. over 1 hour to deionised water (939.7 g) containing DMEA (29.2 g), 15.2% hydrazine (47.2 g) and Disponyl AFX4030 (40.0 g). The isocyanate-terminated prepolymer temperature during dispersion was kept at 60° C. and the dispersion temperature was controlled between 25 to 30° C.

Stage 2: Polyurethane vinyl (80/20) hybrid dispersion: To the dispersion prepared in Stage 1 (1560.0 g) was added a 10% tBHPO solution in water (3.5 g) and a 1% FeEDTA solution in water (1.7 g) followed by feeding a 2.5% IAA solution in water (10.6 g) over a period of 45 minutes. The resultant polyurethane vinyl hybrid dispersion was filtered through 75 micron filter cloths.

Sediment Determination:

Sediment is unstabilised solid material (in the order of microns rather than nanometers) which is formed during dispersing or reaction and which will settle or precipitate upon storage and/or heating. It may be determined quantitatively by centrifuging. The sediment content was determined by taking 50 $cm^3$ of the resultant dispersion of the examples prepared above, diluting this with water (1:1) and centrifuging the diluted composition for 15 minutes at 1500 rpm (276G) rpm in a centrifuge tube.

Each division on the tube tip represents 0.05 $cm^3$ or 0.05% sediment. The outcome, i.e. the level of solid sediment in the tube tip was then multiplied by 2 to take into account the dilution factor.

TABLE 1

| Example | I | II | III | IV | V | VI | VII |
|---|---|---|---|---|---|---|---|
| Solids (%) | 30.5 | 33.2 | 33.0 | 33.8 | 33.6 | 33.7 | 30.4 |
| pH | 7.9 | 8.4 | 7.9 | 8.3 | 8.8 | 8.8 | 8.1 |
| Viscosity (mPa · s) * | 140 | 260 | 230 | 380 | 380 | 288 | 180 |
| Sediment (%) # | 0.2 | 0.2 | <0.05 | <0.05 | 0.3 | 0.1 | 0.3 |
| Absorbance ** | 25 | 16 | 69 | 50 | 17 | 33 | 113 |

TABLE 1-continued

| Example | | | | | | |
|---|---|---|---|---|---|---|
| Particle size (nm) | 80.2 | 87.8 | 94.6 | 119.4 | 98.6 | 172.8 | 170.2 |
| MFFT (° C.) | 18 | 18 | 16 | <5 | 10 | 9 | <5 |
| KH (s) *** | 181 | 200 | 169 | 176 | 160 | 132 | 160 |
| Elongation at break (%) | 147 | 127 | 62 | 107 | 104 | 118 | 148 |
| Yellowness ## | 1.6/2.9 | 0.5/2.6 | 0.4/1.6 | 0.2/2.6 | 0.3/2.8 | 0.4/2.6 | 0.2/2.9 |
| Yellowing (Δb) | 1.3 | 2.1 | 1.2 | 2.4 | 2.5 | 2.2 | 2.7 |

| Example | VIII | IX | X | XI | XII | XIII |
|---|---|---|---|---|---|---|
| Solids (%) | 33.6 | 33.4 | 33.6 | 33.1 | 34.0 | 33.3 |
| pH | 8.2 | 8.1 | 7.9 | 7.7 | 8.1 | 8.1 |
| Viscosity (mPa·s) * | 48 | 376 | 432 | 210 | 136 | 516 |
| Sediment (%) # | 0.4 | 0.2 | <0.05 | 0.2 | 0.4 | <0.05 |
| Absorbance ** | 107 | 7 | 4 | 127 | 18 | 3 |
| Particle size (nm) | 115.1 | 70 | 77 | 179 | 67.6 | 57.1 |
| MFFT (° C.) | 12 | 20 | 45 | 40 | <5 | 17 |
| KH (s) *** | 146 | 175 | 162 | 169 | 154 | 179 |
| Elongation at break (%) | 55 | 59 | 65 | 59 | 115 | 150 |
| Yellowness ## | 0.3/2.1 | 0.1/1.8 | 0.4/2.4 | 1.3/3.0 | 0.3/2.6 | 0.3/2.6 |
| Yellowing (Δb) | 1.8 | 1.7 | 2.0 | 1.7 | 2.3 | 2.3 |

\* A Brookfield viscosity at 25° C.
\*\* The measured absorbance by spectrometry at 650 nm using a path length of 1 mm.
\*\*\* The König Hardness (KH) of a dried film cast on a glass plate with a wet film thickness of 80 micron.
\# The sediment was determined before filtration.
\#\# The yellowness of the dried film before UV exposure/after UV exposure where the UV exposure was 10 × 400 mJ/cm².

COMPARATIVE EXAMPLE I

Preparation of a Polyurethane Vinyl Hybrid Dispersion with an Acid Value of 23 mg KOH/g A 1000 cm³ flask equipped with a thermometer and overhead stirrer was charged with DMPA (28.6 g), CHDM (15.6 g), Terathane 1000 (273.6 g), MMA (130.0 g), Rubinate 9279 (202.2 g) and Ionol cp (0.1 g). The reaction was allowed to exotherm to 70° C. After the exotherm was complete the reaction was kept at 85° C. for 2 hours. The NCO-content of the isocyanate-terminated prepolymer was 4.26% (theoretical 4.62%).

A dispersion of the isocyanate-terminated prepolymer was made by feeding 500.0 g of the isocyanate-terminated prepolymer at 60° C. over 1 hour to 1127.8 g of deionised water containing DMEA (20.1 g), 15.2% hydrazine (48.1 g) and ABEX2545 (24.0 g). The isocyanate-terminated prepolymer temperature during dispersion was kept at 50° C. and the dispersion temperature was controlled between 25 to 30° C.

Due to large sediment value of the polyurethane dispersion (>20% before filtration) the process to prepare polyurethane vinyl hybrid was discontinued.

COMPARATIVE EXAMPLE II

This example was prepared as described in Example 12, U.S. Pat. No. 5,137,961 and comprises the preparation of a polyurethane prepolymer based on toluene diisocyanate (246.0 g, 80/20 ratio for the 2,4- and 2,6-isomers), diphenylmethane diisocyanate (246.0 g, 75/25 ratio for the 4,4' and 2,4' isomers), terathane-1000 polyetherdiol (579.2 g, OH=114.3 mg KOH/g), CHDM (8.8 g), DMPA (120.0 g), BA (133.3 g), MMA (266.7 g), STY (400.0 g) and Topanol O inhibitor (1.6 g).

The polyurethane dispersion was prepared by the addition of 400.0 g prepolymer to an aqueous phase which contained triethyl amine (26.1 g), hydrazine (1.0) and water (841.2 g). The residual hydrazine (0.5 g) was simultaneously fed, also in 1 hour at ambient temperature. The degree of neutralisation on equivalents was 1.44:1 and the total degree of extension was 0.24:1.

The final polyurethane vinyl (50/50) hybrid polymer was prepared by radical polymerisation of the vinyl monomers in the dispersion as well as additional vinyl monomers according to the following recipe: Polyurethane dispersion (851.8 g), deionised water (309.6 g), tBHPO (1.3 g), IAA, 1% solution in water (60.0 g), STY (88.6 g), MMA (15.6 g), acrylonitrile (18.0 g) and BA (11.1 g).

However was not possible to prepare the U/A from the dispersions described above following the procedure described in example 12, U.S. Pat. No. 5,137,961. The exact reproduction coagulated immediately after the start of the redox reaction resulting in about 100% sediment. The resultant specification did not correspond to the specifications given in U.S. Pat. No. 5,137,961.

The invention claimed is:

1. An aqueous composition with a sediment content ≦5% comprising a polyurethane vinyl hybrid dispersion and containing ≦0.5 wt % of 1-methyl-2-pyrrolidinone by weight of the composition; wherein the polyurethane has an acid value in the range of from 25 to 65 mgKOH/g and is obtained by the reaction of:
   A) an isocyanate-terminated prepolymer formed from components comprising:
      (i) 36 to 60 wt % of at least one aromatic organic polyisocyanate;
      (ii) 0 to 30 wt % of at least one aliphatic organic polyisocyanate;
      (iii) 0 to 15 wt % of at least one isocyanate-reactive polyol bearing ionic and/or potentially ionic water-dispersing groups with a weight average molecular weight ≦500 g/mol;
      (iv) 0 to 10 wt % of at least one isocyanate-reactive polyol bearing non-ionic water-dispersing groups;
      (v) 0 to 15 wt % of at least one isocyanate-reactive polyol with a weight average molecular weight ≦500 g/mol not comprised by (iii) or (iv);
      (vi) 20 to 58 wt % of at least one isocyanate-reactive polyol not comprised by (iii), (iv) or (v);
   where (i)+(ii)+(iii)+(iv)+(v)+(vi) add up to 100 wt %;
   where the NCO/OH ratio is in the range of from 1.2:1 to 2.5:1; and B) at least one active-hydrogen chain extending compound;

where the active-hydrogen/NCO ratio is in the range of from 0.4:1 to 1.3:1; in the presence of (a) ≦5 wt % of 1-methyl-2-pyrrolidinone by weight of polyurethane and (b) at least one reactive diluent.

2. An aqueous composition according to claim 1 wherein the ratio of polyurethane to vinyl polymer in the polyurethane vinyl hybrid is in the range of from 95:5 to 30:70.

3. An aqueous composition according to claim 1 wherein the calculated Tg of the vinyl polymer in the polyurethane vinyl hybrid is in the range of from 20 to 120° C.

4. An aqueous composition according to claim 1 wherein at least 20 to 80 wt % of component (i) consists of methylenebis (phenyl isocyanate) (MDI).

5. An aqueous composition according to claim 1 where components (i)+(ii)+(iii)+(v) add up to ≧42 wt %.

6. An aqueous composition according to claim 1 wherein the reactive diluent comprises between 5 and 40% by weight of both the isocyanate-terminated prepolymer and the reactive diluent together.

7. An aqueous composition according to claim 1 wherein the reactive diluent comprises vinyl monomers.

8. An aqueous composition according to claim 7 wherein the reactive diluent comprises 40 to 100 wt % of vinyl monomer selected from the group consisting of methyl methacrylate and ethylmethacrylate.

9. An aqueous composition according to claim 7 wherein the reactive diluent comprises <45 wt % of styrene and styrene based vinyl monomers.

10. An aqueous composition according to claim 1 wherein the ionic water-dispersing groups in the isocyanate-terminated prepolymer are neutralised with a neutralising agent in the range of from 0.5:1 to 1.4:1.

11. An aqueous composition according to claim 1 wherein the ionic-water-dispersing groups are anionic water-dispersing groups and ≧60 wt % of the anionic water-dispersing groups in the isocyanate-terminated prepolymer are neutralised with an oxygen containing amine.

12. An aqueous composition according to claim 11 where the oxygen containing amine is selected from the group consisting of N-ethyl morpholine; N-methyl morpholine; and $R^1(R^2)NR^3OH$ with a Mn in the range of from 88 to 118, where $R_1$, $R_2$ and $R_3$ are independently $C_1$ to $C_4$ alky.

13. An aqueous composition according to claim 1 which when in the form of film has a König Hardness ≦120s.

14. An aqueous composition according to claim 1 which when in the form of a film has an elongation at break ≧50% and a König Hardness ≧120s.

15. An aqueous composition according to claim 1 with a minimum film forming temperature≦500 C.

16. An aqueous composition according to claim 1, containing ≦2 wt % of a co-solvent by weight of the composition with a minimum film forming temperature ≦23° C. and which when in the form of a film has a König Hardness 120s.

17. An aqueous composition according to claim 1 with a solids content in the range of from 20 to 55 wt %.

18. An aqueous composition according to claim 1 with a weight average particle size less than 500 nm.

19. A substrate having a coating obtained from an aqueous composition according to claim 1.

20. A substrate according to claim 19 selected from the group consisting of wood, metal, concrete, plastic and glass.

21. A floor having a coating obtained from an aqueous composition according to claim 1.

22. An aqueous composition according to claim 1, wherein all of the isocyanate groups are directly bonded to an aromatic group, irrespective of whether aliphatic groups are also present.

23. A process for making an aqueous composition with a sediment content ≦5% comprising a polyurethane vinyl hybrid dispersion and containing ≦0.5 wt % of 1-methyl-2-pyrrolidinone by weight of the composition, wherein the polyurethane has an acid value in the range of from 25 to 65 mgKOH/g, and where the process is carried out in steps comprising:

I: reacting in the presence of (a) ≦5 wt % of 1-methyl-2-pyrrolidinone by weight of polyurethane and (b) at least one reactive diluent;
(i) 36 to 60 wt % of at least one aromatic polyisocyanate;
(ii) 0 to 30 wt % of at least one aliphatic polyisocyanate;
(iii) 0 to 15 wt % of at least one isocyanate-reactive polyol bearing ionic and/or potentially ionic water-dispersing groups with a weight average molecular weight ≦500 g/mol;
(iv) 0 to 10 wt % of at least one isocyanate-reactive polyol bearing non-ionic water-dispersing groups;
(v) 0 to 15 wt % of at least one isocyanate-reactive polyol with a weight average molecular weight ≦500 g/mol not comprised by (iii) or (iv);
(vi) 20 to 58 wt % of at least one isocyanate-reactive polyol not comprised by (iii), (iv) or (v);
where (i)+(ii)+(iii)+(iv)+(v)+(vi) add up to 100 wt %;
where the NCO/OH ratio is in the range of from 1.2:1 to 2.5:1 to form an isocyanate-terminated prepolymer;

II: neutralising the isocyanate-terminated prepolymer with a neutralising agent;

III: forming an aqueous dispersion of the isocyanate-terminated prepolymer in water;

IV: reacting the isocyanate-terminated prepolymer with at least one active hydrogen chain-extending compound to form the polyurethane; where the active hydrogen/NCO ratio is in the range of from 0.4:1 to 1:3:1;

V: optionally adding additional vinyl monomer; VI: polymerising the reactive diluent and vinyl monomer added in step V.

24. A process according to claim 23 where step II is carried out by means of at least an in-line mixer.

25. A process according to claim 23 where the time between step III and step IV is less than 40 minutes.

26. A process according to claim 23 where at least 50 wt % of the active-hydrogen chain extending compound is present in the water before completion of step III.

27. A method of coating a substrate using an aqueous composition according to claim 1 comprising applying the composition to a substrate.

* * * * *